Peck & Hicks,
Wood Planing Machine,

N°6,392.
Patented Apr. 24, 1849.

UNITED STATES PATENT OFFICE.

CHAS. H. PECK AND C. HICKS, OF ST. LOUIS, MISSOURI.

PLANING-MACHINE.

Specification of Letters Patent No. 6,392, dated April 24, 1849.

*To all whom it may concern:*

Be it known that we, CHARLES H. PECK and COLEMAN HICKS, of the city and county of St. Louis and State of Missouri, have invented a new and Improved Machine for Planing, Tonguing, and Grooving Plank, &c.; and we do hereby declare the following to be a full, clear, and exact description thereof, reference being had to the accompanying drawings, making a part of this specification, in which—

Figure 4:
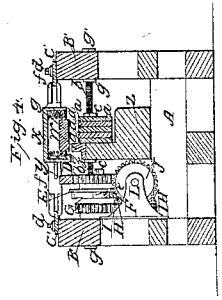
Figure 2:
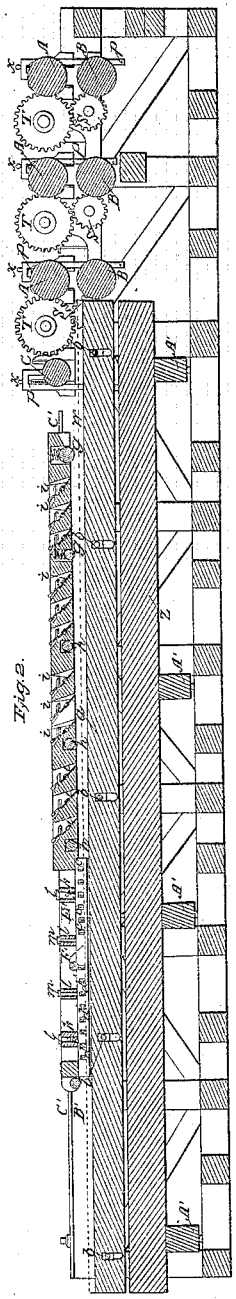
Figure 3:
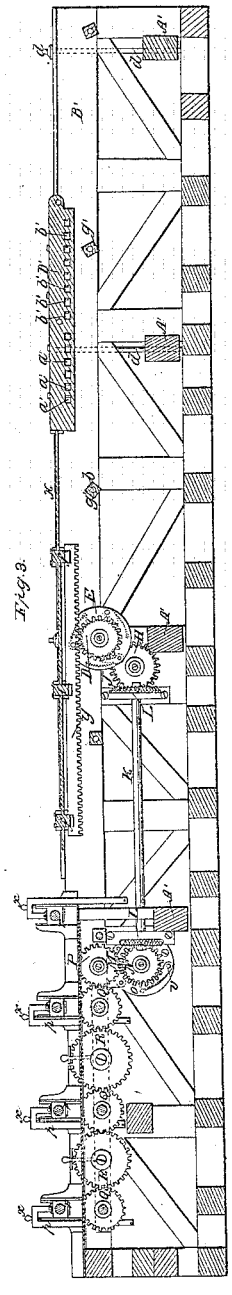
Figure 1:
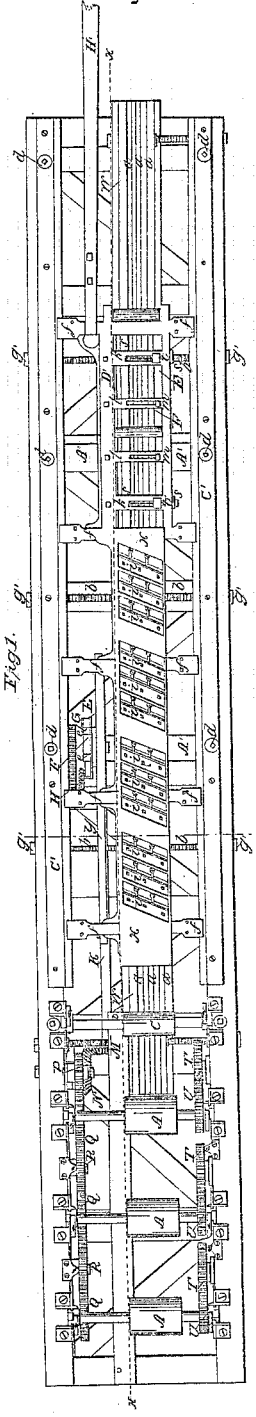

Figure 1 is a top view Figs. 2 and 3 vertical longitudinal sections in the line $x$ $x$ of Fig. 1; and Fig. 4 is a vertical transverse section in the line $o$ $o$ of Fig. 1.

We construct an oblong supporting frame for the reception of the respective operating parts of our planing, tonguing and grooving machine in a strong and substantial manner. The operation of reducing, planing, tonguing and grooving we effect by means of suitable cutters arranged in a reciprocating frame X, D', E', combined with an adjustable rest W, $a$ $a$ $a$ and a series of rollers A, B, serving as feeding and retaining rollers in the manner hereinafter set forth.

C', C', are metallic plates secured to the upper surfaces of the side pieces B', B', of the supporting frame; their inner edges projecting over the inner corners of the beams and forming ways for the reciprocating cutter-frame X, D', E' supported by the arms $f$, $f$, as represented in the drawings.

The face of the portion X, of the reciprocating cutter-frame, in which the series of reducing and smoothing cutters $i$, $i$ $i$, are placed, inclines upward slightly from the rear to the front as shown in Fig. 2, for the purpose of adapting the cutters placed therein to planks of various thicknesses.

At the front end of the reciprocating frame there are placed pressure rollers $g$, $g$, in movable bearings, which are acted upon, and pressed downward by springs as shown in Fig. 2; the object of these pressure rollers is to hold the plank firmly upon the bed W, while the cutters are acting upon the same, during the forward movement of the reciprocating frame. Friction rollers $h$, $h$, are inserted in the face of the reciprocating cutter-frame for relieving the same from friction upon the upper surface of the plank.

In the side piece D' of the after portion of the reciprocating cutter frame we insert in the forward portion thereof a series of smoothing plane irons $a'$, $a'$, $a'$, to act upon the edge of the plank and in the rear portion thereof we insert a series of tonguing cutters $b'$, $b'$, $b'$.

F' is an adjustable cutter-stock in which is inserted a series of smoothing-plane irons $c'$, $c'$, at its forward portion, and a series of grooving cutters from its center to the rear portion thereof, as shown in Fig. 2. The cutter-stock F' is secured to the under side of the transverse pieces K, K, and L, L, connecting the sides D' and E' of the cutter frame, by means of the arms $t$, $t$, projecting up through slots $k$ $k$, and the screw bolts $m$, $m$, passing down through slots in $l$, $l$, into F'.

$s$, $s$, are screw-bolts passing through female screws in the arms $t$, $t$, with their inner ends confined by collars attached to the inner ends of the slots in $k$, $k$, by means of which the cutter stock F is adjusted to the varying widths of plank. Immediately below the reciprocating cutter frame is located the adjustable bed, which supports the plank while it is operated upon by the planing tonguing and grooving cutters. The rest is composed of one principal piece of metal W, resting upon the raised shoulder of the beam Z, and the narrow metallic pieces $a$, $a$, $a$, arranged by the side of W, supported by the screws $b$ $b$ passing through the side pieces B' B' of the machine, and through slots in the pieces $a$, $a$, of the rest. The rest may be varied in width to suit the width of the plank to be operated upon, by elevating one or more of the strips $a$, $a$, to the level of W. The strips are retained in an elevated position by forcing them together with great power by the nuts $c$, $c$, working on the screws $b$, $b$, as shown in Fig. 4. The rest should be adjusted to such a width that the edges of the plank to be operated on will project over each side of the face of the rest a distance equal to the depth of the tongue and groove to be formed on the edge of the plank.

The screw bolts $b$ $b$ and nuts $g'$ $g'$ working on the same, on each side of the side-pieces B', B', of the machine, serve to strengthen and support the same. The beam Z, is supported and its position adjusted, by the transverse pieces A', A', connected to, and suspended by the screw bolts $d$, $d$, passing down through the side pieces B', B', and metallic plates C', C', as represented in the drawings.

The reciprocating cutter frame is operated by a pitman H', driven by any suitable power. The plank is drawn into the machine and retained while the series of cutters are operating upon the same by the series of rollers A, B, combined with each other, and so arranged and combined with rack $y$, connected to the cutter-frame, that the reverse movement of the cutter frame, will revolve the rollers and draw the plank into the machine; and the forward movement of the cutter frame will cause no motion to be imparted to the rollers; but the rollers will remain stationary and retain the plank while it is acted on by the cutters during the forward movement of the cutter frame.

The rack $y$, takes into the spur wheel D, made fast to the side of the circular plate E, on the same axle; the cogwheel D and plate E are revolved freely on their axle by the forward movement of the rack $y$, but the reverse movement of the rack causes the cog wheel D to impart motion to its axle through the medium of the spring clicks $e$, $e$, secured to the side of the plate E (opposite D) and taking into the teeth of the ratchet wheel F made fast to the axle.

G is a spur wheel on the same axle with D, E, F, which matches into and imparts motion to, a cog wheel on the same axle with the bevel wheel H. The bevel wheel H, matches into and imparts motion to the bevel wheel J, and the shaft K, to which it is secured; the bevel wheel M on the rear end of K matches into and communicates motion to the bevel wheel N; a spur wheel on the same axle with N, matches into and communicates motion to the cog wheel P, which in turn communicates motion to the pinion Q, on one of the lower rollers B, and this in turn communicates motion to the intermediate cog wheel R, and this wheel to the cog wheel Q on the next lower roller B, and so through the series.

The upper series of rollers A are connected to the lower series, by means of a cog wheel placed at the opposite extremity of each lower roller, from the cog wheel Q, matching into a cog wheel S, which in turn matches into the cog wheel T, and this wheel matches into the cog wheel U, on the axle of each upper roller.

C, is an independent pressure roller in advance of the feeding and retaining rollers (A, B,) for holding the front end of the plank or board firmly upon the rest or bed when it first comes in contact with the cutters in the reciprocating frame. The bearing boxes $r$, $r$, of the upper feeding rollers (A, A,) slide freely up and down in guiding supports, and are connected to the bent arms $p$, $p$, to which weights are attached for pressing the rollers with the requisite force upon the plank to feed the same forward into the machine, and retain the plank or board securely in a stationary position while the series of planing tonguing and grooving cutters are operating upon the same. The series of rollers (A, B,) are held fast and prevented from turning in a reverse direction while the series of cutters are operating on the plank (during the forward movement of the reciprocating frame,) by means of the series of spring clicks or ratchets $v$, $v$, on the stationary plate O, taking into a ratchet wheel on the same axle with the bevel pinion N, and the spur wheel which matches with and imparts motion to the cog wheel P.

What we claim as our invention and desire to secure by Letters Patent, is—

The feeding the boards or plank into the machine and retaining them in a stationary position while they are operated upon by the series of planing, tonguing and grooving cutters in the reciprocating frame, by means of the pressure rollers (A, B,) which are so combined with the reciprocating frame, and with suitable retaining clicks and ratchet wheels, that the rollers will be rotated during the backward movement of the reciprocating frame, and retained in a stationary position during the forward movement of the same, substantially as herein set forth.

CHAS. H. PECK.
COLEMAN $\times$ HICKS.
his mark

Witnesses:
  Z. C. ROBBINS,
  J. R. MCALISTER.